Feb. 23, 1932.　　T. W. JOHNSON　　1,846,059
CULTIVATOR
Filed Jan. 24, 1929　　2 Sheets-Sheet 1
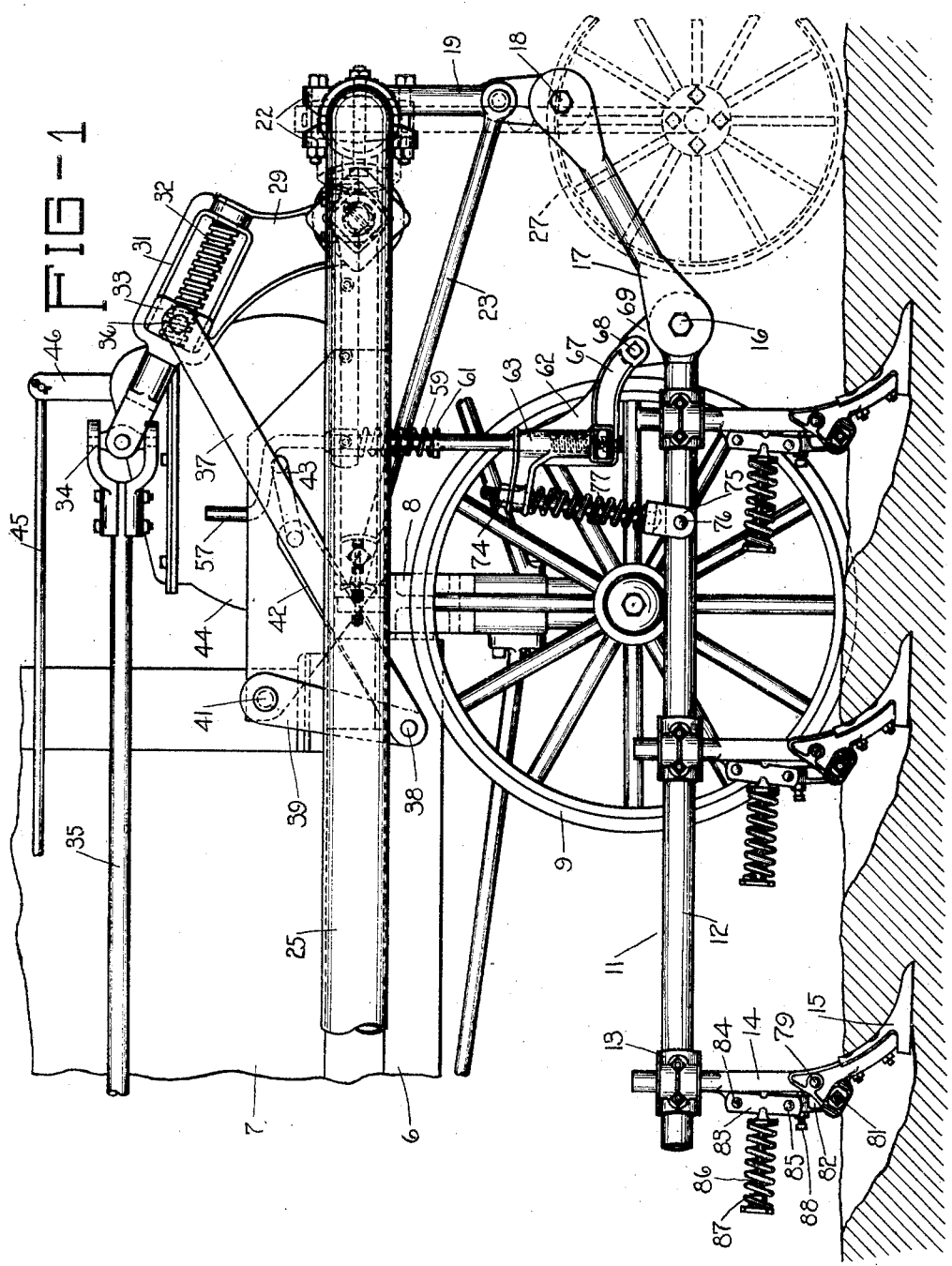
WITNESS
Walter Ackerman
INVENTOR
Theodore W. Johnson
BY Brown, Jackson, Boettcher & Dienner
ATTORNEYS

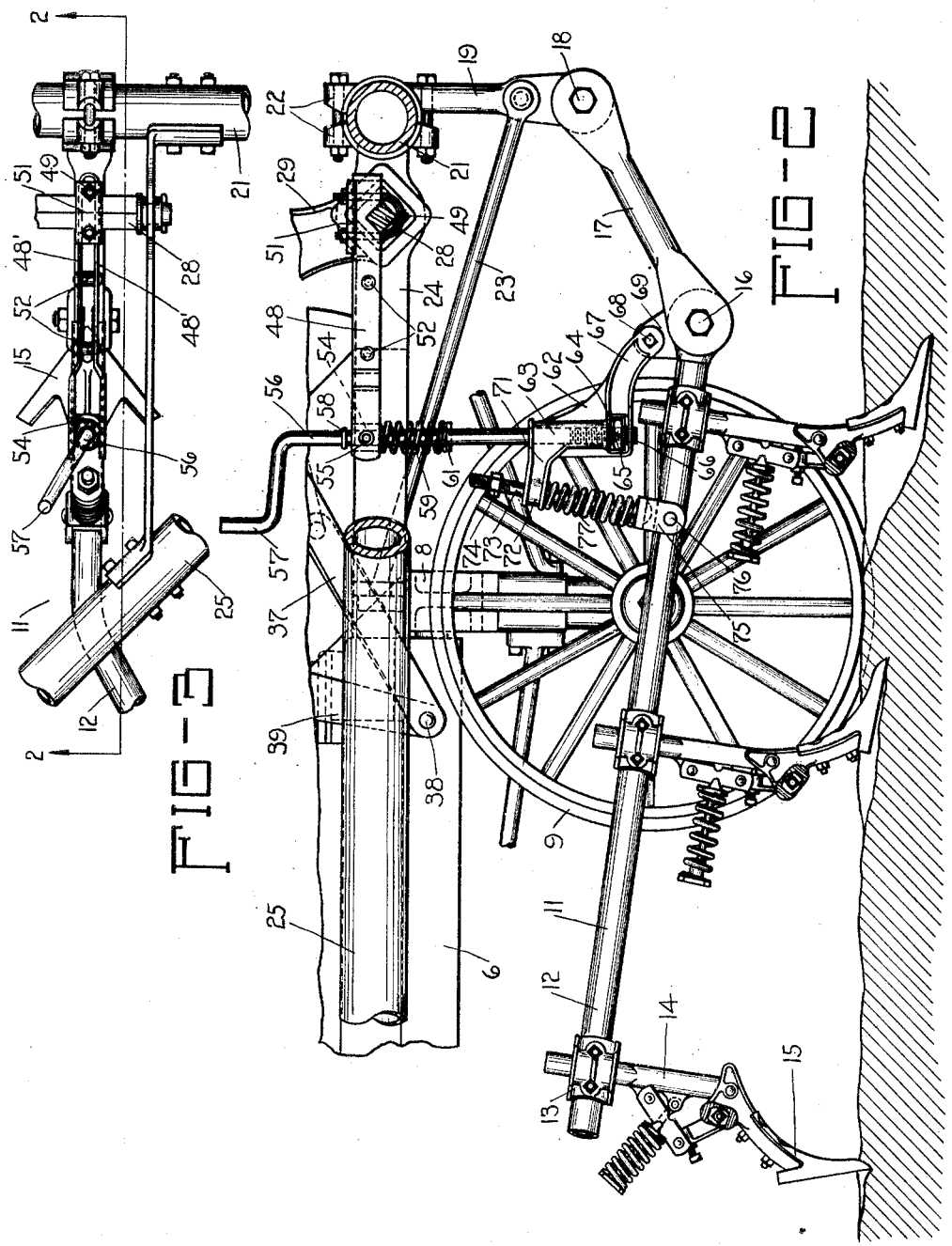

Patented Feb. 23, 1932

1,846,059

UNITED STATES PATENT OFFICE

THEODORE W. JOHNSON, OF MOLINE, ILLINOIS, ASSIGNOR TO DEERE & COMPANY, OF MOLINE, ILLINOIS, A CORPORATION OF ILLINOIS

CULTIVATOR

Application filed January 24, 1929. Serial No. 334,689.

The present invention relates to cultivators and has particular reference to improvements in the mounting of the soil tilling devices on the implement.

Generally speaking, the invention has as its principal object to provide an improved arrangement of spring relief means which will yield and prevent breakage or other damage of the mechanism in the event of one of the cultivator shovels or other tilling device striking a rock, heavy root, or other obstruction in the ground. The cultivating shovels—or such other ground engaging devices as may be used—are usually mounted on a rig beam extending substantially horizontally below the implement frame.

The present invention contemplates, as part of the cooperative combination of relief devices, the provision of spring relief means interposed between each cultivator shovel and the rig beam whereby each shovel has the capability of yielding relatively to the rig beam under abnormal stress such as occurs when the shovel strikes an embedded obstruction. The invention also embodies the provision of improved spring relief means in the mounting of the rig beam on the implement frame. The front portion of the beam has connection with the implement whereby the rear end of the beam can swing upwardly around a pivot at the front end thereof, and whereby the entire beam can shift upwardly with a bodily lifting or translational motion relatively to the implement frame. As above stated, the invention is characterized by the provision of spring relief means for yieldingly resisting upward pivotal motion of the rear end of the beam, and for yieldingly resisting upward bodily shifting movement of the entire beam relatively to the implement. Thus, a yielding relief is provided for all of the cultivator shovels under every working condition, the shovels being free to yield relatively to the beam, the beam being free to swing upwardly with a pivotal motion, and the beam also being free to be displaced upwardly with a bodily shifting movement relatively to the implement frame.

Such mounting of the cultivating devices is of particular benefit in motor driven cultivators, wherein the cultivating devices are raised and lowered by power. In such type of implements, the shovels may be subjected to damaging stresses while the implement is standing stationary. For example, the lowering of the rigs by power may be effected while the implement is stationary and, under these conditions, one of the shovels may strike a rock or other obstruction, or extremely hard ground, preventing the shovel from entering the ground. In the absence of any relief to take care of this situation there is the possibility of breaking the cultivator rig or the power lift mechanism, since a considerable part of the weight of the tractor and implement may be brought to bear upon such shovel or shovels. Such possibility of breakage is avoided in the present construction by virtue of the ability of each cultivator rig beam to yield pivotally and bodily. Thus, the rigs are safeguarded against breaking stresses arising either in the travel of the implement or in the raising and lowering of the rigs.

Another object of the invention is to provide an improved independent depth adjustment for each cultivator rig, which is preferably associated with the spring relief means for the rig.

Another object is to provide improved adjusting means for adjusting the angle of the rig beam with respect to the horizontal when in cultivating position, such latter adjusting means being also preferably associated with the spring relief means for the rig beam. A further object is to combine such spring relief devices and adjusting devices with power lift mechanism operative to raise and lower the rigs with a "parallel lift" motion wherein each rig beam is maintained substantially parallel with or at a fixed angle to the ground in all of the raised and lowered positions of the rig beam, and which power lift mechanism will also raise the rigs to the same predetermined height irrespective of the depth adjustment of the rigs which has been established through the master adjusting means provided for manually adjusting the rigs vertically in unison.

Other objects and advantages of the invention will appear in the following description of a preferred embodiment of the cultivator. In the accompanying drawings illustrating such embodiment:—

Fig. 1 is a fragmentary side view illustrating the mounting of the cultivator on the front of the tractor which supports and propels the implement, and showing the rigs at approximately a maximum depth of penetration;

Fig. 2 is a somewhat similar view, corresponding to a section taken on the plane of the line 2—2 of Fig. 3, and illustrating the spring relief action when one of the cultivator shovels strikes an obstruction in the ground; and Fig. 3 is a fragmentary plan view showing the power lift connection between each cultivator rig and the transverse lifting shaft.

I have chosen to illustrate the invention in a type of motor driven cultivator which is disclosed in the co-pending application of Elmer McCormick, Serial No. 257,177, filed February 27, 1928. Accordingly, I shall not describe in any great detail the general construction and features constituting the subject matter of the above application.

The implement, in its entirety, comprises a main or tractor frame 6, of any design suitable to support the parts of the implement, and supported at the rear by traction wheels (not shown) arranged to be propelled by a motor mounted on said frame and enclosed in a suitable housing or hood 7 at the front end of the tractor, in accordance with the usual practice. The front end of the tractor frame 6 has pivotal mounting on a front axle 8 which supports the front steering wheels 9 at its outer ends, the pivotal mounting of the tractor frame on the axle 8 permitting transverse rocking movement between the frame and axle.

The wheels 9 have pivotal mounting on the ends of the axle 8, similarly to the mounting of automobile wheels, and are arranged to be steered through a suitable steering wheel which is disposed in proximity to the operator's seat at the rear end of the tractor.

The cultivator portion of the machine is preferably constructed in the form of an attachment adapted for connection with the front end of the tractor unit just described. This cultivator portion comprises a plurality of cultivator rigs disposed transversely across the front of the machine, abreast of each other, one of said cultivator rigs being indicated at 11 in its entirety. As clearly described in the aforementioned co-pending application, there are usually two of these rigs extending rearwardly between the front steering wheels 9 of the tractor; there is also a similar pair of rigs disposed outwardly to the righthand side of the tractor unit, and another pair of rigs disposed outwardly to the lefthand side of the tractor unit. A description of the application of the invention to one of these rigs will suffice for the purposes of the present specification, as the application of the invention to all of the rigs is substantially the same.

Each rig comprises a substantially horizontal rig beam 12 on which are mounted at spaced points brackets 13 adjustably supporting shanks 14 on which the cultivator shovels 15 are mounted, three of such cultivator shovels being shown as mounted on each rig beam, although the number thereof may, of course, be varied.

The front end of each rig beam 12 is pivotally connected by a pivot bolt 16 in the bifurcated rear end of a draft link 17. The front end of such link is bifurcated and pivotally connected by a pivot bolt 18 over the lower end of an arm 19 depending from a superposed frame structure. This frame structure constitutes the attachment frame on which the cultivator rigs are mounted and which is detachably connected to the tractor frame 6. Said attachment frame comprises a transversely extending front frame bar 21 to which the several depending arms 19 are rigidly secured by the clamping hub sections 22, one of these depending arms 19 being provided for each cultivator rig unit 11. A brace link 23 extends diagonally upward and rearward from the lower portion of each arm 19 and is secured at its rear end to the attachment frame. The front frame bar 21 is supported on the axle 8 by a supporting frame structure 24 (Fig. 2) extending between the axle 8 and the central portion of bar 21, and is supported adjacent to its outer ends by diagonally extending bars 25 (Figs. 2 and 3) which have pivotal attachment with the tractor frame at rearwardly situated points. The laterally extending outrigger portions of the attachment frame carrying the outwardly disposed pairs of cultivator units are usually pivotally connected to the intermediate portion of the attachment frame, and are supported on outwardly disposed wheels 27 so that these portions of the attachment frame can rise and fall in passing over uneven ground (such being fully disclosed in the aforementioned McCormick application).

Extending transversely across the attachment frame, directly in rear of the front frame bar 21, is a rock shaft 28 which is preferably divided into sections coupled together by universal joints to accommodate rising and falling movement between different sections of the rock shaft. Rocking movement is transmitted to said shaft through an arm 29 secured thereto, and comprising a slotted frame portion 31 in which an adjusting screw 32 is rotatably mounted. A nut 33 engages over the screw 32 within the slotted frame 31 so as to be adjustable relatively to the arm 29 through rotation of the screw 32. The rearwardly projecting end of the adjusting screw 32 is operatively connected through a universal joint 34 with a rotatable adjusting rod 35 extending back to the operator's position on the tractor, rotation of the rod 35 serving to effect the master depth adjustment of all of the cultivator rigs. Pivotally connected at 36 to the nut 33 is a link 37 which extends rearwardly and is pivotally connected at 38 to an arm 39 which in turn is pivotally mounted at its upper end on a pivot 41 carried by the frame. A second link 42 extends forwardly from the pivot 38 and has its front end pivotally connected to a crank 43 which is adapted to be swung through successive half-revolutions from a power lift clutch. Said clutch is enclosed in a housing 44 mounted at the front end of the tractor and is operatively connected to be driven from the engine of the tractor in a manner clearly disclosed in the aforementioned copending application. Said link 42, however, may be driven from any suitable source of power as for instance from a half-revolution clutch mounted elsewhere than on the front end of the tractor.

With the parts in the position shown in Fig. 1, when the power lift clutch is tripped, through actuation of the tripping rod 45 and lever 46, the crank 43 revolves through a half-revolution, pulling forwardly on the link 42 and, hence, swinging the link 37 forwardly through the pivoted arm 39. Such forward motion of the link 37 is transmitted through the pivot 36 and nut 33 to the arm 29, resulting in a rocking movement of the shaft 28 in a clockwise direction, which rocking movement operates to lift all of the cultivator rigs, as will be presently described. The rigs are held in raised position through the automatic disengagement and locking of the power lift clutch, which holds the crank 43 in its forward position. The rigs are returned to cultivating position by again tripping the power lift clutch, thereby causing the crank 43 to return to the position illustrated in Fig. 1, such causing the reverse rocking movement of the transverse rock shaft 28. As previously remarked, the master depth adjustment of all of the cultivator rigs is effected by rotating the adjusting screw 32 to shift the nut 33 to different points along the length of said screw, such adjustment causing the shaft 28 to be rocked in either direction to raise or lower the penetrating depth of the rigs. At this time the pivot 38 is locked in fixed position through the locked condition of the power lift clutch. As fully described in the aforementioned McCormick application, a predetermined angular relation exists between the pivot point 38 and the angle of the adjusting screw 32 so that, irrespective of the master depth adjustment which has been given the rigs, the latter will always be raised to the same height above the ground in the power lift operation.

Rocking movement of the shaft 28 is transmitted to each cultivator rig 11 through an individual lifting arm 48. As shown in Figs. 2 and 3, said arm comprises two spaced bars 48' having notches in their lower edges for engaging over the polygonal contour of the rock shaft 28, the arm being secured to the shaft by a U-bolt 49 embracing the under side of the shaft and extending upwardly through a plate 51 bearing upon the upper edges of the bars 48'. If desired, the two side portions 48' of the lifting arm can be constructed from a single length of bar stock by folding the same intermediate its ends, as shown in Fig. 3. Spacing sleeves and rivets 52 maintain the two side portions of the lifting arm in spaced relation.

Mounted between the spaced rear ends of the lifting arm 48 is a pivot block 54 having laterally projecting trunnion pins 55 journaled in the side bar portions of the lifting arm. Extending down through the pivot block, and rotatable therein, is a rod or shaft 56 having its upper end bent into the form of an adjusting crank 57. The pivot block 54 is free to slide downwardly along the rod 56, but the movement thereof in an upward direction is limited by a stop collar 58 on the rod 56. Mounted on said rod below the lifting arm is a compression spring 59 which bears at its upper end against the under side of the pivot block 54 and which bears at its lower end against a pin or other stop projection 61 carried by the rod 56.

Thus, upward swinging movement of the lifting arm 48 effects a positive upward lifting of the rod 56 through the collar 58, whereas, downward swinging movement of the lifting arm only transmits a downward force to the rod through the compression spring 59.

The lower portion of the rod 56 is connected with the rig through a connecting member 62. The latter comprises a relatively long sleeve portion or bearing guide 63 in which the lower end of the rod 56 is rotatably mounted. The lower end of the sleeve portion 63 is formed with a transverse slot or opening 64 in which a nut 65 is removably mounted, the nut being held against rotation by engagement with the sides of the slot 64. The lower end of the rod 56 is threaded, as indicated at 66, for screwing through the nut 65, and it will be evident that by rotating the upper crank end 57 of the rod the connecting member 62 can be caused to move upwardly or downwardly along the lower portion of the rod.

Extending forwardly from the lower portion of the connecting member 62 is an arm 67 which is pivotally connected at 68 to a lug 69 projecting upwardly from the rig beam 12 in close proximity to the rig beam pivot 16. Extending rearwardly from the upper portion of the connecting member 62 is an arm 71 having a guide boss 72 formed at its end. Extending upwardly through said guide boss is a rod 73 having free sliding movement therein, the upper portion of said rod being threaded to receive a nut 74 which serves as an adjustable limit stop for controlling downward movement of the rod through the guide boss.

The lower end of said rod is secured to a yoke or clevis 75 which embraces the rig beam 12 and is pivotally connected therewith by a transverse pivot pin 76 extending through the yoke and rig beam. A compression spring 77 surrounds the rod 73 between the yoke 75 and the under side of the guide boss 72, such spring normally tending to force the rig beam downwardly into approximately a horizontal position, as determined by the engagement of the stop nut 74 with the upper side of the guide boss 72. It will be seen that the rod 73 functions as a yieldable, adjustable supporting link for supporting the rear portion of the rig beam from the connecting member 62.

Each cultivator shovel 15 is pivotally connected at 79 to its supporting shank 14 so as to permit the shovel to swing rearwardly with respect to the shank. A rearwardly extending portion of the shovel member has a transverse pivot bolt 81 adjustably mounted thereon, which pivot bolt has pivotal connection with a lower toggle link 82. An upper toggle link 83 has its upper end pivotally connected at 84 to a lug projecting rearwardly from the shank 14, and has its lower end pivotally connected to the lower toggle link at the knuckle pivot 85. A rearwardly extending rod 86 is pivotally connected to the shank 14, and supports a compression spring 87 arranged to exert its pressure against the rear side of the link 83, thereby tending to maintain the two toggle links approximately in alignment. An adjustable stop screw 88 carried by the lower link 82 and adapted to engage the shank 14 normally maintains the two links slightly out of alignment so that when an abnormal pressure is exerted against the cultivator shovel 15 the two toggle links are free to spring backwardly against the pressure of the spring 87, whereby the cultivator shovel can fold backwardly under the shank 14 in clearing the obstruction, as shown in Fig. 2.

Referring now to the operation of the cultivator, Fig. 2 illustrates the spring relief action occurring when the rear cultivator shovel 53 strikes an obstruction in the forward movement of the implement. Initial relief is obtained by the shovel swinging rearwardly relatively to its supporting shank 14 through the spring relief function of the toggle links 82 and 83. This leaves the shovel deflected backwardly and dragging in the ground. In the majority of prior constructions, when such condition occurred, it was frequently necessary to raise the entire rig or to stop the implement and back the same in order to restore the cultivator shovel after it had passed beyond the obstruction. Such restoration occurs automatically in the present construction by virtue of the mounting of the rig beam, which mounting also gives added relief to the cultivator shovel. The manner in which this automatic restoration occurs will be evident from Fig. 2. When the shovel 15 is deflected rearwardly it has no suction tending to remain in the ground, but rather exerts a camming action against the soil, tending to force itself up out of the ground. The ability of the rig beam 12 to swing upwardly around its front pivot 16 at this time enables the cultivator shovel to force itself up approximately to the surface of the soil, where the cultivator shovel is restored to normal position against the light resistance of the surface soil through the pressure of the spring 87 acting on the toggle links 82, 83.

Thereupon, the pressure of the spring 77 of the spring relief mechanism 73, 77 becomes effective for forcing the rig beam 12 back to its normal position, the suck of the restored cultivator shovel aiding in quickly returning the rig to its normal position.

Some of this same action occurs when either of the two front shovels strikes an obstruction in the travel of the implement. That is to say, such shovel first swings rearwardly through the spring relief afforded by the toggle link connection 82, 83, whereupon the shovel exerts a camming action tending to swing the rig beam 12 upwardly with a pivotal movement around the front pivot 16. However, in the case of these two front shovels, some of the upward movement of the rig beam may be in the nature of an upward shifting or displacement thereof, such being particularly true when the foremost shovel strikes an obstruction. At this time, the entire beam and the connecting member 62 move upwardly with a translational motion through the spring relief afforded by the upper spring relief mechanism comprising the rod 56 and spring 59. Concurrently therewith, the beam shifts backwardly because of the rearward component of motion of the beam pivot 16, following from the upward swinging of the drag link 17, such rearward movement of the beam also relieving the stress imposed on the shovel and enabling the latter to clear itself more readily.

The rod 56 slides upwardly in the pivot block 54 against the pressure of the relief spring 59 until the obstructed shovel can swing forwardly to normal position relatively to its shank, whereupon, the pressure of the spring 59 automatically forces the connecting member 62 and rig beam back to normal position with the shovels engaging in the ground.

With the rigs raised to transport position, if the operator should trip the power lift mechanism for returning the rigs to cultivating position while the implement is standing stationary, no damage can occur to the power lift mechanism should the rig shovels be unable to enter the ground. Relief will occur at this time through the relief springs 59 and 77. If the front end of the beam cannot be forced down to normal cultivating position, the spring 59 will be compressed to allow the lifting arm 48 to move downwardly to its normal position, and if the rear end of the rig beam cannot move down to its normal cultivating position the spring 77 will allow the rear end of the beam to remain raised until the implement starts forward, whereupon the shovels will be forced down to their adjusted cultivating depth through the pressure of the springs 59 and 77.

For effecting an independent depth adjustment of the entire rig, the crank 57 is rotated to move the connecting member 62 upwardly or downwardly along the rod 56, such causing the entire beam to be raised or lowered without changing its angle to the horizontal.

When it is desired to adjust the cultivating depth of the rearmost shovels, the operator can, with one hand, swing the rear portion of the beam 12 upwardly to relieve the spring pressure on the adjusting nut 74, and, with the other hand, he can screw this nut upwardly or downwardly along the rod 73 to change the angle of the beam with reference to the horizontal. It will thus be seen that the present rig mounting enables depth adjustments to be performed easily and expeditiously.

The mounting of the removable nut 65 in the connecting member 62 reduces the cost of manufacture of the connecting member, as this avoids the operation of threading the same, and such construction also permits the nut to be readily substituted if the threads should become worn from the abrasive action of dust, etc.

Having thus described my invention, what I claim as new is:—

1. A cultivating implement comprising a frame, a rig beam, cultivating means mounted on said rig beam, said rig beam tending to move downwardly to bring said cultivating means into engagement with the soil, means connecting said rig beam with said frame for vertical swinging movement of the rear end of said beam and for vertical displacement of the front end of said beam, a lifting arm rockably mounted on said frame, a lifting link rockably connected at its upper end with said lifting arm, means pivotally connecting the lower portion of said link with said beam at longitudinally spaced points of the latter, spring relief means associated with said lifting link for permitting upward swinging movement of the rear end of said beam, and spring relief means associated with said lifting link for permitting upward displacement of the front end of said beam.

2. A cultivating implement comprising a frame, a rig beam, cultivating devices mounted on said rig beam, said beam tending to move downwardly to bring said cultivating devices into engagement with the soil, means connecting said rig beam with said frame for vertical swinging movement of the rear end of said beam and for vertical displacement of the front end of said beam, a lifting arm rockably mounted on said frame, a lifting link pivotally connected between said arm and said beam and operative to positively lift the beam for raising the cultivating devices clear of the ground, said link being normally fixed relative to said beam, spring relief means associated with said lifting link for permitting upward swinging movement of the rear end of said beam, and spring relief means associated with said lifting link for permitting upward displacement of the front end of said beam.

3. A cultivating implement comprising a frame, a rig beam, cultivating means mounted on said rig beam, said beam tending to move downwardly to bring said cultivating means into engagement with the soil, means connecting said rig beam with said frame for vertical swinging movement of the rear end of said beam and for vertical displacement of the front end of said beam, a lifting arm rockably mounted on said frame, a lifting link connected between said arm and said beam and operative to positively lift the beam in its entirety for raising the cultivating means clear of the soil, said link being normally fixed relative to said beam, and spring relief means associated with said lifting link for permitting upward swinging movement of the rear end of said beam and for permitting upward displacement of the front end of said beam relatively to said lifting arm.

4. A cultivating implement comprising a frame, a vertically movable rig beam, vertically movable draft means pivotally connecting the front portion of said beam with said frame, a lifting member mounted on said frame for raising and lowering said beam, said lifting member being connected with the beam and normally fixed relative thereto, cultivating devices mounted on said beam, spring relief means interposed between said cultivating devices and said beam, spring relief means operatively connected between said beam and said lifting member for permitting upward displacement of the entire beam relatively to said lifting member, and spring relief means permitting upward swinging movement of the rear portion of the beam relatively to said draft means.

5. A cultivating implement comprising a frame, a vertically movable rig beam, vertically movable draft means connecting the front portion of said beam with said frame, a lifting member for raising and lowering said rig beam, said lifting member being connected with the beam and normally fixed relative thereto, cultivating devices mounted on said beam, spring relief means interposed between said beam and said lifting member permitting upward displacement of the entire beam relatively to said lifting member, and spring relief means permitting upward swinging movement of the rear portion of the beam relatively to the front portion thereof.

6. A cultivating implement comprising a frame, a rig beam, a draft link pivotally connected between the front portion of said beam and said frame, cultivating devices mounted on said beam, spring relief means interposed between said cultivating devices and said beam, lifting means connected with the frame and with the beam for raising said beam and cultivating devices to inoperative position, spring relief means cooperating with said lifting means and permitting upward displacement of said beam and said draft link, said lifting means being normally fixed relative to said beam, and spring relief means permitting upward swinging movement of the rear portion of the beam relatively to said draft link.

7. A cultivating implement comprising a frame, a rig beam, a draft link pivotally connected between the front portion of said beam and said frame, lifting means connected with the beam and normally fixed relative thereto for raising said beam to inoperative position, cultivating devices mounted on said beam, spring relief means permitting upward displacement of the entire beam and said draft link, and spring relief means permitting upward swinging movement of the rear portion of the beam relatively to said draft link, both of said spring relief means being associated with said lifting means.

8. A cultivating implement comprising a frame, a rig beam, a draft link pivotally connected between the front portion of said beam and said frame, a lifting member mounted on said frame for raising and lowering said beam, means connecting said lifting member with the beam for positively lifting the latter, cultivating devices mounted on said beam, spring relief means interposed between said cultivating devices and said beam, spring relief means permitting upward displacement of said beam and said draft link relatively to said lifting member, said lifting member being normally fixed relative to the beam, and spring relief means permitting upward swinging movement of the rear portion of the beam relatively to said draft link.

9. A cultivating implement comprising a frame, a rig beam, a draft link pivotally connected between the front portion of said beam and said frame, cultivating devices mounted on said beam, a lifting member, connecting means extending between said lifting member and the front portion of said beam, and operable to positively lift the beam, said connecting means being normally fixed relative to the beam, spring relief means permitting upward movement of said connecting means relatively to said lifting member, and spring relief means permitting pivotal movement of said beam relatively to said connecting means.

10. A cultivating implement comprising a frame, a rig beam, a draft link pivotally connected between the front portion of said beam and said frame, cultivating devices mounted on said beam, a lifting member, connecting means pivotally connected between said lifting member and the front portion of said beam, and spring relief means between said beam and said connecting means permitting upward pivotal movement of said beam relatively to said connecting means.

11. A cultivating implement comprising a frame, a rig beam, a draft link pivotally connected between the front portion of said rig beam and said frame, cultivating devices mounted on said beam, a lifting arm, a depending member connected therewith, means pivotally connecting said depending member with one part of said beam, spring relief means connecting said depending member with another part of said beam and permitting pivotal movement of the beam relatively to said depending member, and spring relief means permitting upward movement of said depending member relatively to said lifting arm.

12. A cultivating implement comprising a frame, a rig beam, a draft link pivotally connected between the front portion of said beam and said frame, cultivating devices mounted on said beam, an oscillatory lifting arm mounted on said frame, a rod depending from said lifting arm, a connecting member mounted on said rod and pivotally connected with a forward portion of said beam, a supporting link extending between said connecting member and another portion of said beam, and spring relief means associated with said supporting link permitting pivotal movement of said beam relatively to said connecting member.

13. A cultivating implement comprising a frame, a rig beam, a draft link pivotally connected between the front portion of said beam and said frame, cultivating devices mounted on said beam, a rock shaft, a lifting arm mounted thereon, a depending rod connected with said lifting arm, a connecting member supported on the lower portion of said rod, means pivotally connecting said member with said beam at one point, a supporting rod extending between said connecting member and another point of said beam, spring relief means associated with said supporting rod permitting said beam to pivot vertically relatively to said connecting member, and spring relief means cooperating with said depending rod and said lifting arm permitting relative vertical movement therebetween.

14. A cultivating implement comprising a frame, a rig beam, a draft link pivotally connected between the front portion of said beam and said frame, cultivating devices mounted on said beam, a rock shaft, a lifting arm extending therefrom, a depth adjusting rod pivotally connected with said lifting arm, a connecting member supported by the lower portion of said rod, means establishing a pivotal connection between said connecting member and the forward portion of said beam, a supporting link pivotally connected with said beam at a point in rear of said first mentioned pivot and having supporting engagement with said connecting member, means for varying the effective length of said supporting link for changing the angle of said beam, and spring relief means associated with said supporting link permitting said beam to pivot vertically relatively to said depth adjusting rod and connecting member.

15. A cultivating implement comprising a frame, a rig beam, a draft link pivotally connected between the front portion of said beam and said frame, cultivating devices mounted on said beam, a rock shaft mounted on said frame, a lifting arm extending from said rock shaft, a depth adjusting rod connected with said lifting arm and depending therefrom, a connecting member supported on the lower portion of said rod, means pivotally connecting said beam with said connecting member at a forward pivot point, a supporting link pivotally connecting said beam with said connecting member at a rearward pivot point, means effective upon the rotation of said depth adjusting rod for raising and lowering said connecting member relatively to said lifting arm, spring relief means for permitting upward movement of said connecting member relatively to said lifting arm, means for adjusting the effective length of said supporting link for varying the angle of said rig beam, and spring relief means cooperating with said supporting link permitting vertical pivotal movement of said beam relatively to said connecting member.

16. A cultivating implement comprising a frame, a rig beam, means pivotally connecting the front portion of said beam with said frame, cultivating devices mounted on said beam, a rock shaft mounted on said frame, a lifting member extending from said rock shaft, a connecting member connected with said beam, and a depth adjusting rod extending between said members and having threaded connection with one of said members whereby rotation of said rod is operative to adjust said connecting member vertically relatively to said lifting member.

17. A cultivating implement comprising a frame, a rig beam, means pivotally connecting the front portion of said beam with said frame, cultivating devices mounted on said beam, a rock shaft mounted on said frame, a lifting member extending from said rock shaft, a connecting member, means pivotally connecting said member with said beam at spaced points of the latter, a depth adjusting rod extending between said members, a pivot block pivotally mounted on one of said members and in which said rod is rotatably mounted, and cooperating threads on the other of said members and on said rod whereby rotation of said rod is operative to adjust said connecting member vertically relatively to said lifting member.

18. A cultivating implement comprising a frame, a rig beam, a draft link pivotally connected between the front portion of said beam and said frame, cultivating devices mounted on said beam, a rock shaft mounted on said frame, a lifting arm extending from said rock shaft, a pivot block pivotally mounted on said lifting arm, a depth adjusting rod rotatably supported in said pivot block, and a connecting member supported on the lower portion of said rod and pivotally connected with said beam, said connecting member comprising a threaded portion engaging with a thread on said rod whereby rotation of said rod is operative to raise and lower said connecting member and said beam relatively to said lifting arm.

19. A cultivating implement comprising a frame, a rig beam, a draft link pivotally connected between the front portion of said beam and the frame, cultivating devices mounted on said beam, a rock shaft mounted on said frame, a lifting arm extending from said rock shaft, a bearing block pivotally mounted on said lifting arm, a depth adjusting rod slidably mounted in said bearing block, means for limiting downward movement of said rod in said block, a spring for resisting upward movement of said rod in said block, a connecting member supported on the lower portion of said rod, and means pivotally supporting said beam from said connecting member, said connecting member comprising a threaded portion engaging with a thread on said rod whereby rotation of said rod is operative to raise and lower said connecting member and beam relatively to said lifting arm.

20. A cultivating implement comprising a frame, a rig beam, a draft link pivotally connected between the front portion of said beam and said frame, cultivating devices mounted on said beam, a rock shaft mounted on said frame, a lifting arm extending from said rock shaft, a depth adjusting rod having swiveled connection with said lifting arm, a connecting member supported on the lower portion of said rod, said connecting member comprising a threaded portion engaging with a thread on said rod whereby rotation of said rod is operative to raise and lower said connecting member relatively to said lifting arm, means pivotally connecting said beam with said connecting member at a forward pivot point, a supporting link pivotally connecting said beam with said connecting member at a rearward pivot point, and means for adjusting the effective length of said supporting link for varying the angle of said rig beam.

21. In a power lift cultivator, the combination with a tractor, of a cultivator attachment connected with said tractor and comprising a frame, a rock shaft mounted thereon, power actuated means for transmitting rocking movement to said shaft, a lifting arm extending from said shaft, a vertically movable cultivator rig comprising a cultivating tool, a vertically movable draft link pivotally connecting the front portion of said rig with said frame whereby said rig can pivot vertically relatively to said link and whereby the entire rig can rise and fall with a translatory motion relatively to said frame, lifting means operatively connecting said lifting arm with said cultivator rig at a point on the rig spaced from the pivotal connection thereof with the draft link and operative when said shaft is rocked in one direction to positively lift said rig to transport position with a translatory motion, and spring relief means associated with said lifting means and operative when said shaft is rocked in the other direction to permit the downward translatory motion of said rig to be interrupted independently of motion of said shaft.

22. In a power lift cultivator, the combination with a tractor, of a cultivator attachment connected with said tractor and comprising a frame, a shaft rotatably mounted thereon, power actuated means for driving said shaft, a plurality of cultivator rigs each comprising a cultivating tool, draft means connecting each rig with said frame whereby each rig can swing vertically with a pivotal motion relatively to said draft means and can also rise and fall with a vertical translatory motion relatively to said frame, and lifting means operatively connecting said shaft with each rig for positively lifting said rigs with a vertical translatory motion when said shaft is operated in one direction, but permitting the downward translatory motion of any one or more rigs to be interrupted when said shaft operates in the other direction.

In witness whereof, I hereunto subscribe my name this 16th day of January, 1929.

THEODORE W. JOHNSON.